United States Patent
Falk

(10) Patent No.: US 12,167,240 B2
(45) Date of Patent: Dec. 10, 2024

(54) METHOD FOR CONFIGURING A RADIO CONNECTION

(71) Applicant: Siemens Aktiengesellschaft, Munich (DE)

(72) Inventor: Rainer Falk, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 22 days.

(21) Appl. No.: 17/618,120

(22) PCT Filed: Apr. 24, 2020

(86) PCT No.: PCT/EP2020/061534
§ 371 (c)(1),
(2) Date: Dec. 10, 2021

(87) PCT Pub. No.: WO2020/254016
PCT Pub. Date: Dec. 24, 2020

(65) Prior Publication Data
US 2022/0232380 A1    Jul. 21, 2022

(30) Foreign Application Priority Data
Jun. 17, 2019  (EP) .................................. 19180443

(51) Int. Cl.
*H04W 12/069*   (2021.01)
*H04W 12/08*    (2021.01)
(Continued)

(52) U.S. Cl.
CPC ......... *H04W 12/069* (2021.01); *H04W 76/15* (2018.02); *H04W 88/06* (2013.01); *H04W 12/08* (2013.01)

(58) Field of Classification Search
CPC ..... H04W 12/09; H04W 12/06; H04W 12/04; H04W 76/16; H04W 12/0431; H04W 12/69; H04W 12/08
(Continued)

(56) References Cited

U.S. PATENT DOCUMENTS 6,735,630 B1 * 5/2004 Gelvin .................... B60R 25/33
                                                         709/200
7,107,620 B2 * 9/2006 Haverinen ........ H04W 12/0431
                                                         713/168
(Continued)

FOREIGN PATENT DOCUMENTS

CN    105657059 A    6/2016
CN    106105147 A   11/2016
(Continued)

OTHER PUBLICATIONS

English translation of EP2453633 Jun. 2023 (Year: 2023).*
(Continued)

*Primary Examiner* — William D Cumming
(74) *Attorney, Agent, or Firm* — Schmeiser, Olsen & Watts, LLP

(57) ABSTRACT

Provided is a method for configuring a wireless connection between a mobile wireless terminal and a mobile wireless network, in which the mobile wireless network contains at least one first subnetwork, which is accessible with a credential of at least a first type, and contains at least one second subnetwork, which is accessible with a credential of at least a second type, and a first wireless connection to a first subnetwork and a second wireless connection to a second subnetwork have different wireless transmission parameters. In the event of a request for access by the mobile wireless terminal to a selected subnetwork—a predetermined credential is determined for the request for access to the selected subnetwork, the type of the predetermined
(Continued)

credential is determined, and—at least one wireless transmission parameter is selected and activated depending on the determined type of the predetermined credential.

14 Claims, 4 Drawing Sheets

(51) Int. Cl.
*H04W 76/15* (2018.01)
*H04W 88/06* (2009.01)

(58) Field of Classification Search
USPC .......................................................... 455/411
See application file for complete search history.

(56) References Cited

U.S. PATENT DOCUMENTS

| | | | | |
|---|---|---|---|---|
| 8,353,052 | B2* | 1/2013 | Larsson | H04W 12/04 |
| | | | | 726/29 |
| 10,405,186 | B1* | 9/2019 | Latsha | H04W 8/183 |
| 10,681,506 | B1* | 6/2020 | Walker | H04L 65/1063 |
| 11,095,638 | B2* | 8/2021 | Rossi | H04L 9/3228 |
| 2003/0014646 | A1* | 1/2003 | Buddhikot | H04L 63/162 |
| | | | | 713/184 |
| 2004/0193513 | A1* | 9/2004 | Pruss | G06Q 40/12 |
| | | | | 705/30 |
| 2005/0166043 | A1* | 7/2005 | Zhang | H04L 63/08 |
| | | | | 713/155 |
| 2007/0054668 | A1 | 3/2007 | Scheinert et al. | |
| 2007/0143832 | A1* | 6/2007 | Perrella | H04L 9/3271 |
| | | | | 726/5 |
| 2012/0270524 | A1* | 10/2012 | Venkataramu | H04W 12/06 |
| | | | | 455/411 |
| 2012/0284785 | A1 | 11/2012 | Salkintzis | |
| 2013/0007853 | A1 | 1/2013 | Gupta et al. | |
| 2013/0160101 | A1* | 6/2013 | Hakola | H04L 63/0823 |
| | | | | 726/7 |
| 2013/0179681 | A1* | 7/2013 | Benson | G06Q 20/38215 |
| | | | | 713/155 |
| 2013/0254867 | A1* | 9/2013 | Koster | G06F 21/00 |
| | | | | 726/10 |
| 2014/0325209 | A1* | 10/2014 | Koster | H04L 9/3268 |
| | | | | 726/10 |
| 2015/0281966 | A1 | 10/2015 | Griot et al. | |
| 2016/0164883 | A1 | 6/2016 | Li et al. | |
| 2016/0165528 | A1 | 6/2016 | Montemurro et al. | |
| 2016/0241398 | A1 | 8/2016 | Lewis | |
| 2016/0270141 | A1* | 9/2016 | Sharma | H04W 76/16 |
| 2016/0277400 | A1* | 9/2016 | Maurya | H04L 63/18 |
| 2017/0104748 | A1* | 4/2017 | Koster | H04L 9/3268 |
| 2017/0104749 | A1* | 4/2017 | Koster | H04W 12/069 |
| 2018/0239902 | A1* | 8/2018 | Godard | G06F 21/53 |
| 2022/0232380 | A1* | 7/2022 | Falk | H04W 12/06 |
| 2022/0321556 | A1* | 10/2022 | Gandhi | H04W 12/068 |

FOREIGN PATENT DOCUMENTS

| | | | |
|---|---|---|---|
| EP | 2453633 | A1 | 5/2012 |
| TW | 201635186 | A | 10/2016 |
| WO | WO-2018203402 | A1 * | 11/2018 |

OTHER PUBLICATIONS

English trnaslation of WO2018/203402 (Year: 2023).*
M. Kuroda, R. Nomura and W. Trappe, "A Radio-independent Authentication Protocol (EAP-CRP) for Networks of Cognitive Radios," 2007 4th Annual IEEE Communications Society Conference on Sensor, Mesh and Ad Hoc Communications and Networks, San Diego, CA, USA, 2007, pp. 70-79, (Year: 2007).*
PCT International Search Report mailed Jul. 3, 2020 corresponding to PCT International Application No. PCT/EP2020/061534 filed Apr. 24, 2020.

* cited by examiner

METHOD FOR CONFIGURING A RADIO CONNECTION

CROSS-REFERENCE TO RELATED APPLICATIONS

This application claims priority to PCT Application No. PCT/EP2020/061534, having a filing date of Apr. 24, 2020, which claims priority to EP Application No. 19180443.4, having a filing date of Jun. 17, 2019, the entire contents both of which are hereby incorporated by reference.

FIELD OF TECHNOLOGY

The following concerns a method, a mobile radio terminal, a network access node and a computer program product for configuring a radio connection between a mobile radio terminal and a mobile radio network.

BACKGROUND

A subscriber of a mobile radio network normally needs to authenticate himself to the mobile radio network for network access. A subscriber in this case can be a human person associated with the mobile radio terminal. A subscriber can alternatively be a device, for example a device in an Internet of Things. The subscriber is normally subscribed to a selection of services that are accessible to a mobile radio terminal via a radio connection to the mobile radio network. The authentication for accessing the mobile radio network can be effected, for example in the case of a wireless local area access network, also called a WLAN, by using a pre-shared key (PSK) or a digital certificate, a password or another extensible authentication protocol (EAP). Such access authentication can also be set up and operated by smaller or larger companies that do not specialize in the operation of a mobile radio network.

In the case of second generation (Global System for Mobile Communication, GSM), third generation (Universal Mobile Telecommunication System, UMTS), fourth generation (Long Term Evolution, LTE) and current fifth generation (5G) cellular mobile radio networks based on a standard of the third generation partnership project (3GPP), on the other hand, access authentication is effected as subscriber authentication by using a subscriber identification module (subscriber identity module SIM, universal subscriber identity module USIM or IP multimedia service identity module ISIM). The actual authentication in this case is effected by using a symmetric key. The subscriber identification module is generally a chip-card-based security module. It performs cryptographic operations for authentication and provides the mobile radio terminal with one or more session keys in order to cryptographically protect user communication, in particular on the radio connection.

Such a subscriber identification module used in cellular mobile radio networks is used for other functions. For example it contains configuration data for preferred networks. The subscriber identification module is issued by a mobile radio provider, provisioned, and managed during operation. The technology therefor is extremely complex, however, which means that in practice it can be used only by network operators specializing in mobile radio.

The document US 2007/0054668 A1 discloses a private base station that can be connected to the Internet and provides wireless access to the Internet in a small area. The access by a mobile radio to services in the cell is controlled by an exclusivity database.

The document EP 2 453 633 A1 discloses a method in which a subscriber identity device comprises a first subscription dataset for subscriber authentication in a first mobile radio network, or a second subscription dataset for subscriber authentication in a second mobile radio network, and a particular one of the included subscription datasets is used for subscriber authentication on the basis of an available mobile radio network.

The document US 2013/0007853 A1 describes a method in which a mobile radio is able to ascertain, without user interaction, whether subscription information stored in the mobile radio can be used for an available network. If this is the case, the mobile radio performs authentication with the network on the basis of credentials that are included in the stored subscription information.

In particular in the sphere of 5G mobile radio networks, in addition to a spatially extensive, publicly accessible mobile radio network, application scenarios in which 5G mobile radio technology is intended to be used similarly to a WLAN are also under discussion. This is also referred to as a private 5G application or as a 5G campus network. This allows for example a local mobile radio network based on 5G technology to be operated in a regionally or geographically limited area, for example a factory hall, an industrial estate, a city network or the like. Such 5G campus networks or local 5G applications are referred to as private mobile radio networks below.

However, one obstacle to feasible, simple use of such private 5G applications is the high level of effort associated with producing, provisioning and managing the subscriber identification module for secure network access. Secondly, it is necessary to ensure that mobile radio terminals, or mobile radio modems, which, in particular for data networks, provide the radio connection and the access to a mobile radio network, can be adjusted and in particular restricted to the radio parameters of the desired private 5G application network. It should also be ensured that the public cellular mobile radio network does not have the radio connections disturbed, in particular.

SUMMARY

An aspect relates to a mobile radio terminal easily manageable secure network access to a subnetwork of the mobile radio network without disturbing the radio connections in another subnetwork of the mobile radio network, in particular a generally accessible part of the mobile radio network.

According to a first aspect, embodiments of the invention concern a method for configuring a mobile radio connection between a mobile radio terminal and a mobile radio network, wherein the mobile radio network contains at least one first subnetwork, which is accessible with a credential of at least one first type, and contains at least one second subnetwork, which is accessible with a credential of at least one second type, and a first radio connection to the first subnetwork and a second radio connection to the second subnetwork have different radio transmission parameters, wherein an access request from a mobile radio terminal to the first or second subnetwork results in the credential predetermined for the access request for the first or second subnetwork being ascertained, the type of the credential used being ascertained, and at least one radio transmission parameter being selected and activated on the basis of the ascertained type of the predetermined credential.

As a result, it is possible for a mobile radio terminal having a credential of the first type, for example a subscriber identity module in the form of a SIM card with USIM or ISIM functionality, to activate and use all radio access variants with technical support in a first subnetwork. If a credential of a second type is ascertained, on the other hand, only the radio transmission parameters that are specified by this credential of the second type are selected. Although it is therefore possible for the mobile radio terminal to be in variable and adjustable form in terms of supported radio transmission parameters, inappropriate or incorrect adjustment of the radio transmission parameters in particular when using private subnetworks can be avoided. It is not necessary for a subscriber to configure the radio technologies of the mobile radio terminal that are supposed to be supported himself.

In addition, the first credential is designed only for use in a first authentication protocol and the second credential is designed only for use in a second authentication protocol.

By way of example, the credential of the first type is used in an authentication protocol standardized by a 4G or 5G, but the credential of the second type is used for example in an extended application protocol with a transport layer security protocol EAP-TLS, which is used in particular for authentication in a wireless local area network WLAN. The credential of the first type is provided by a SIM card, for example, which is in the form of a component that is either detachable from the mobile radio terminal or integrated in the mobile radio terminal. This has the advantage that the credentials used, or the different authentication protocols associated therewith, allow detection of a difference between the radio transmission parameters, and hence of physical access to different subnetworks, and a distinction to be drawn between them.

In an embodiment, the first radio connection and the second radio connection are provided using an identical transmission method.

In a 5G mobile radio network, for example first radio connections and second radio connections are provided using the same radio transmission method, but the first and second radio connections differ in respect of their radio parameters, such as for example in respect of the frequency bands used, the permissible transmission power, the bandwidth per transmission channel or the modulation method, or in respect of the parameters of a modulation method. An example of such a radio transmission method is 5G New Radio (5G NR), which is described in the standard 3GPP TS38.300. This in particular permits a mobile radio terminal, or a subscriber with a single mobile radio terminal, to gain access to different subnetworks but then permits the radio transmission parameters to be automatically stipulated, and accordingly adjusted, for the same radio transmission method by the different credentials.

In an embodiment, the mobile radio network is a cellular mobile radio network, in particular a 5G network based on a standard of a third-generation partnership project 3GPP, and the first subnetwork is a public mobile radio network and the second subnetwork is a non-public mobile radio network.

A public mobile radio network is generally accessible to a subscriber subscribed to an operator for the purpose of accessing the mobile radio network. A public mobile radio network of this type is normally accessible in a geographically extensive area. A non-public mobile radio network, on the other hand, is normally accessible in a geographically greatly restricted area. The first and the second subnetwork differ in that radio connections to the first or second subnetwork have at least one different radio transmission parameter. It is therefore in particular also possible for a generally accessible, public first subnetwork to be distinguished from a merely locally accessible, non-public second subnetwork, for example a 5G campus network or 5G industrial network, in regard to the access credential and for the applicable radio transmission parameters to be automatically ascertained therefrom.

In an embodiment, the access request is made when a mobile radio terminal or a network access node or a machine connected to the mobile radio terminal is started and/or is in operation and/or when the mobile radio terminal is authenticated in a subnetwork. The machine can be a machine tool, a milling machine, a 3D printer for additive manufacturing, a robot or a driverless transport system, for example.

This has the advantage that even when a mobile radio terminal is started, that is to say is switched on or activated, a specific subnetwork for access is ascertained for a mobile radio terminal, and the ascertained credential is used to automatically select and activate the applicable radio transmission parameters on the mobile radio terminal or on the network access node. In particular, when the mobile radio is started, it is possible to check whether the radio transmission parameters activated before it was switched off are still permitted with the credentials that are available in the mobile radio terminal when it is restarted. As soon as a definite credential is ascertained when a service is requested, the radio transmission parameters are adjusted on the basis of the ascertained type of the credential. Moreover, it is additionally possible for the type of a credential used by the network to be ascertained and evaluated in order to select and activate at least one radio transmission parameter on the basis thereof.

A check during operation, for example at periodically recurring times or when triggered by specific events, is used to make an access request, and this involves the radio transmission parameters being checked. The access request can alternatively be initiated by a network access node when it is started or in operation. In particular, the access request is made when the mobile radio terminal is authenticated in a subnetwork. Accordingly, a network access authentication involves using the credential for a subscriber authentication and for example an additional key agreement.

In an embodiment, the credential of the second type is a digital certificate and is used to authenticate the mobile radio terminal for access to the mobile radio network.

A digital certificate, for example based on an X.509 standard of the International Telecommunication Union ITU-T, is frequently used in a WLAN, for example, to authenticate the communication partners. It is then in particular advantageous for the digital certificates to be awarded and managed in an automated manner, easily and using known, reusable procedures. A private operator of a second subnetwork of the second type is therefore able to carry out the provision of type-2 credentials easily and with little effort itself. The access entitlement method using a subscriber identification module (SIM, USIM, ISIM, 5G SIM), or using a 3GPP AKA (authentication and key agreement) protocol using the subscriber identification module, which is associated with greater administrative effort, is therefore obsolete.

The digital certificate can in particular be used for subscriber or mobile radio terminal authentication and also negotiation of a key session in an EAP-TLS protocol. A digital certificate can also be used for authentication protocols based on an IP security protocol IPsec/IKEv2 or a transport layer security protocol TLS, DTLS, however.

In an embodiment, the credential of the second type contains restrictive information about prohibited radio transmission parameters, and applicable radio transmission parameters are not activated.

This has the advantage that the boundary points of the prohibited radio transmission parameter ranges provide permitted ranges within which the radio transmission parameters can be selected and used by the device. This allows freedom of choice for the radio transmission parameters outside the restrictive information provided in the credential of the second type.

In an embodiment, the credential of the second type contains positive information about permitted radio transmission parameters, and only permitted radio transmission parameters are activated.

This allows precise specification of the permitted radio transmission parameters and reduces adaptation of the radio transmission parameters in the event of changes within the prohibited ranges of radio transmission parameters.

In an embodiment, the credential of the second type contains additional information about a geographical scope of application and/or a temporal scope of application of the radio transmission parameters.

Access to a second subnetwork can therefore also be narrowed down to a geographical area and/or periods of time to which the restrictive or positive information relates. Additionally, a network name or an identifier of network access nodes for which network access is permitted or impermissible may also be included.

In an embodiment, predetermined information comprising a predetermined set of radio transmission parameters is associated with the type-2 credential and the predetermined set of radio transmission parameters is activated if the type-2 credential contains no information about the radio transmission parameters.

This has the advantage that even if information about the radio transmission parameters is not explicitly available within the type-2 credential, information about possible radio transmission parameters for accessing the chosen subnetwork is specified. This prevents radio transmission parameters of public subnetworks of the mobile radio network from being used when accessing a second subnetwork, and therefore the public subnetwork from being disturbed by the mobile radio terminal.

In an embodiment, a network access server ascertains the radio transmission parameters from the type-2 credential during a network access authentication of the mobile radio terminal, wherein network access is granted only if the radio transmission parameters of the radio connection from the mobile radio terminal to a network access node tally with the ascertained radio transmission parameters of the type-2 credential.

This has the advantage that it is not necessary to transmit an additional message for conveying the information about the radio transmission parameters to the network access server, since the credential relating to the network access authentication is transmitted to the network access server and evaluated there.

In an embodiment, the network access node ascertains the radio transmission parameters of the radio connection to the mobile radio terminal and provides the ascertained radio transmission parameters to the network access server or to the network access node for comparison with the radio transmission parameters from the type-2 credential.

This has the advantage that the radio transmission parameters of the radio connection from the mobile radio terminal to the network access node are ascertained and therefore a check on the currently available radio transmission parameters compared to the radio transmission parameters that are available in or assigned to the type-2 credential is concordant.

With radio transmission parameters are for example information about the radio technology, for example LTE, 5G-NR (3GPP 5G New Radio), WLAN or based on a WiMAX standard. Radio transmission parameters can also comprise a frequency range, or frequency band, a modulation method, a maximum transmission power, a statement about the ratio of transmission times to non-transmission times, also referred to as duty cycle, or antenna parameters. Antenna parameters are for example information about the form of a transmission beam, so-called beamforming, or about the antenna configuration, for example of multi-antenna systems, in particular of multiple-in and multiple-out antenna systems (MIMO), which require the use of beamforming in relation to the base station so as not to disturb other subscribers.

A second aspect of embodiments of the invention concern a mobile radio terminal for configuring a radio connection to a mobile radio network, comprising at least one processor that is designed so as, in the event of an access request from the mobile radio terminal to a selected subnetwork, to ascertain a credential predetermined for the access request for the selected subnetwork, to ascertain the type of the predetermined credential, and to select and activate at least one radio transmission parameter on the basis of the ascertained type of the credential used.

This has the advantage that a mobile radio terminal supports a wide range of radio transmission parameters and hence radio technologies but, depending on the subnetwork for which access is requested by a credential, just uses the radio transmission parameters associated with the credential, in particular type 2, to set up the radio connection. The mobile radio terminal can therefore be used for subnetworks having different radio transmission parameters, and the radio transmission parameters used are automatically matched to the subnetwork for which access is requested. As such, only frequency bands that are approved for second subnetworks are used for accessing a second subnetwork, for example.

A third aspect concerns a network access node, which terminates a radio connection from a mobile radio terminal, for configuring a radio connection between a mobile radio terminal and a mobile radio network, comprising at least one processor that is designed so as, on receiving an access request from the mobile radio terminal to a selected subnetwork, to ascertain a credential predetermined for the access request for the selected subnetwork (20, 22), to ascertain a type (11, 12) of the predetermined credential, and to select and activate at least one radio transmission parameter on the basis of the ascertained type of the credential used.

A network access node can physically terminate a radio connection and accordingly be for example a NodeB of a 3G or 4G or 5G mobile radio network or an access point of a WLAN network. A network access node can also terminate the radio connection vis-à-vis the signaling protocol used. Accordingly, a network access node is a radio network controller RNC of a 3G or 4G mobile radio network or an access management function of a 5G mobile radio network. A similar situation applies to network nodes of a WLAN or WiMAX network, for example. The network access node can therefore ascertain and activate the permitted radio parameters for the radio connection in the same way as the mobile radio terminal.

A fourth aspect of embodiments of the invention concern a computer program product (non-transitory computer readable storage medium having instructions, which when executed by a processor, perform actions), comprising a computer-readable medium that can be loaded directly into a memory of a digital computer, comprising program code parts suitable for performing the steps of the aforementioned method.

A mobile radio terminal may for example be in the form of a mobile radio modem that sets up and provides a radio connection to the mobile radio network. The mobile radio modem may for example be connected to further machines that have no radio transmission component of their own, and may provide communication between the other devices and the mobile radio network. Other machines can be a machine tool, a milling machine, a 3D printer, a robot, an autonomous vehicle or a driverless transport system, for example. A mobile radio terminal can alternatively be connected to a subscriber in the form of a human person who uses the mobile radio terminal to communicate with the mobile radio network.

Within the context of embodiments of the invention, a processor can be understood to mean one or more single processors. A processor can in particular be a main processor, a microprocessor or microcontroller or a digital signal processor.

A computer program product, such as for example a computer program means, may for example be provided or delivered as a storage medium, such as for example as a memory card, or in the form of a downloadable file from a server in a network.

The embodiments and features described for the proposed method apply to the proposed mobile radio terminal and the network access node accordingly.

BRIEF DESCRIPTION

Some of the embodiments will be described in detail, with reference to the following figures, wherein like designations denote like members, wherein.

DETAILED DESCRIPTION

Figure 1:
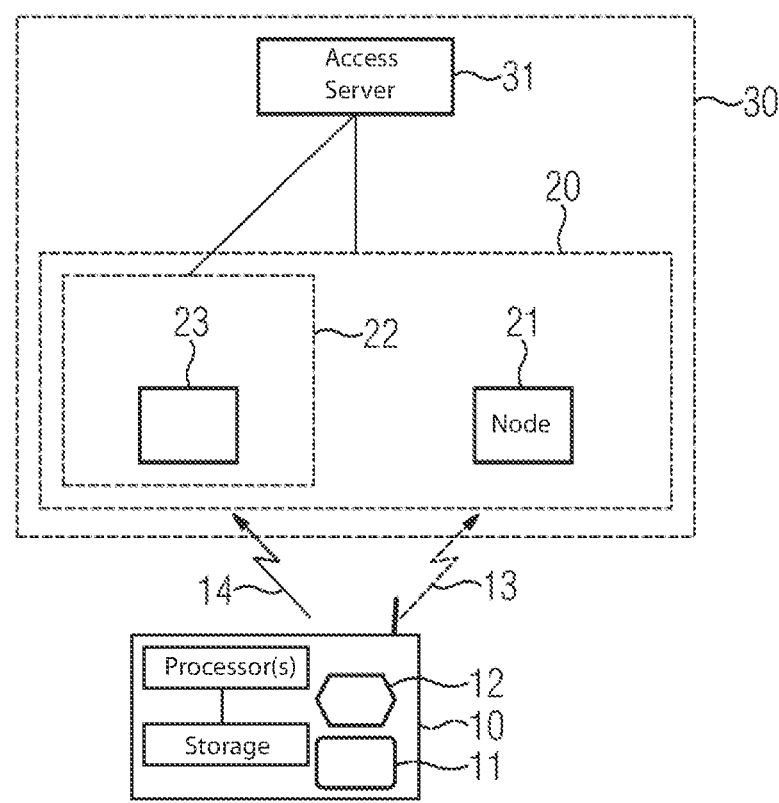
FIG. 1 shows a schematic diagram of a mobile radio network with an exemplary embodiment of a mobile radio terminal.

FIG. 1 shows a mobile radio network 30 that is designed and operated as a cellular mobile radio network for example based on a 5G mobile radio standard of the third-generation partnership project 3GPP. Such a mobile radio network 30 comprises at least one first subnetwork 20, which is accessible to a mobile radio terminal 10 in an extensive geographical area by way of a first radio connection 13 to an access node 21. The mobile radio network 30 additionally comprises at least one second subnetwork 22, which is accessible to the mobile radio terminal 10 in a geographically narrower area, for example a factory hall or an industrial estate, by way of a second radio connection 14 to an access node 23.

The first radio connection 13 and the second radio connection 14 have different radio transmission parameters, for example different frequency ranges, different channel widths, different permissible transmission powers, different permissible duty cycles and/or different modulation methods are used. In the first subnetwork 20, for example radio technologies based on LTE or earlier 2G or 3G mobile radio standards are provided. In the second subnetwork, typical radio technologies based on the fourth-generation mobile radio standard LTE, radio technologies based on the WLAN or WiMAX standard and new radio technologies based on a 5G standard are available, for example 5G New Radio.

The mobile radio terminal 10 can in particular be a mobile radio modem that configures the radio interface and provides the radio connection 13, 14 for example for one or more devices connected to the mobile radio terminal. A user of the mobile radio terminal 10, the user also being a subscriber of the mobile radio network 30, can be a device, for example, or else a human person. The mobile radio terminal 10, or its user, uses a respective credential of the first type 11 in order to authenticate itself to the first subnetwork 20 for an access request. The credential of the first type is normally provided by a subscriber identification module, also referred to as a SIM card or UICC (universal integrated circuit card), and comprises a secret and at least one cryptographic function for authenticating the mobile radio terminal for access to the first subnetwork 20 of the mobile radio network 30. By contrast, a type-2 credential 12 is used for access for the second subnetwork 22. The type-2 credential 12 differs from the type-1 credential 11 and is for example a digital certificate that is used to authenticate the mobile radio terminal 30 for access to the second subnetwork 22 of the mobile radio network 30. The access permission is checked by an access server 31, which monitors network access for one or more first and/or second subnetworks, for example.

Figure 2:
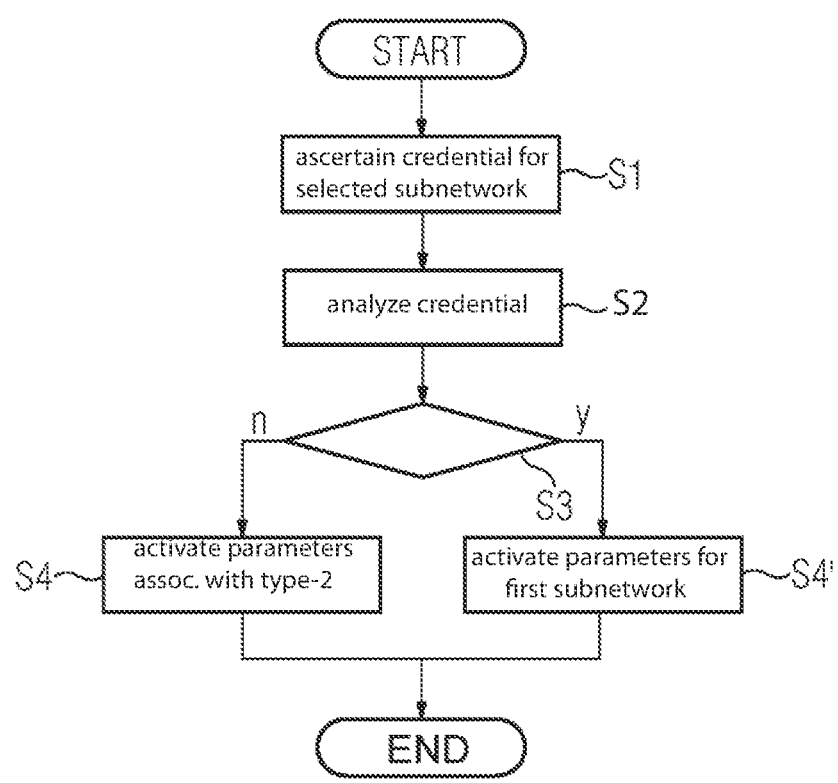
FIG. 2 shows a first exemplary embodiment of the method as a flowchart.

FIG. 2 now shows the method according to embodiments of the invention, which is performed in the mobile radio terminal 10 or in the network access node. It begins from a starting state START, in which there is an access request from the mobile radio terminal 10 to a selected subnetwork. The access request can be generated and available repeatedly when the mobile radio is switched on or activated or during operation, for example. The access request can in particular be generated or available for a network access authentication of the mobile radio.

In the first method step S1, the credential predetermined for the selected subnetwork is ascertained. The subnetwork can be selected directly, for example. The subnetwork can alternatively be selected by a requested service and an association of a subnetwork for providing the service, for example.

In method step S2, the credential is analyzed and categorized as a type-1 or type-2 credential, and therefore the type of the predetermined credential is ascertained. Multiple different type-1 or type-2 credentials may be known in this case. The ascertained type, see S3, is taken as a basis for ascertaining the radio transmission parameters associated with the credential and for activating the radio transmission parameters in the mobile radio terminal, see method step S4 or S4'.

If a type-1 credential is ascertained in method step S3, the radio transmission parameters for the first subnetwork of the mobile radio network are accordingly activated in step S4'. If a type-2 credential is ascertained, the predetermined set of radio transmission parameters that is associated with the type-2 credential is selected from the type-2 credential, and activated, in method step S4, for example. The method then moves to a final state, in which the radio connection is set up in accordance with the radio transmission parameters.

A type-2 credential is in particular in the form of a digital certificate, for example based on the X.509 standard. The digital certificate as a type-2 credential can explicitly comprise a radio transmission parameter. The radio transmission parameter can comprise a definite radio transmission parameter set, for example, which is activated for a radio connection to the second network. The type-2 credential can contain the radio transmission parameter as restrictive information indicating the radio technologies and radio parameters with which this certificate can be used for mobile radio network access. Restrictive information is provided by boundary values of a permitted frequency band, for example. The radio transmission parameter can alternatively be indicated by positive information defining permissible radio transmission parameters.

It is likewise possible for a predetermined set of transmission parameters to be associated with the credential if radio transmission parameters are not defined explicitly. This predetermined set of radio transmission parameters is then applied. Furthermore, a geographical area and/or periods of time to which these radio transmission parameters relate may be indicated. Additionally, a network name, for example based on a service set identifier SSID in a WLAN, or an identifier of base stations, for example of an access point, may also be included.

Within the scope of application of second subnetworks of for example a 5G mobile radio network, it cannot be assumed that a user has the necessary technical knowledge to correctly configure and adjust the radio transmission parameters. The described method does not require a user himself to configure which radio technologies or radio transmission parameters are meant to be supported on the mobile radio terminal. The mobile radio terminal can therefore adapt the information about its technical capabilities on the basis of the activated radio transmission parameters. That is to say that the mobile radio terminal does not provide fixed, static information about its own technical radio transmission options fundamentally supported from an implementation point of view, but rather only provides information about the actual radio transmission parameters that are dependent on the credential.

Figure 3:
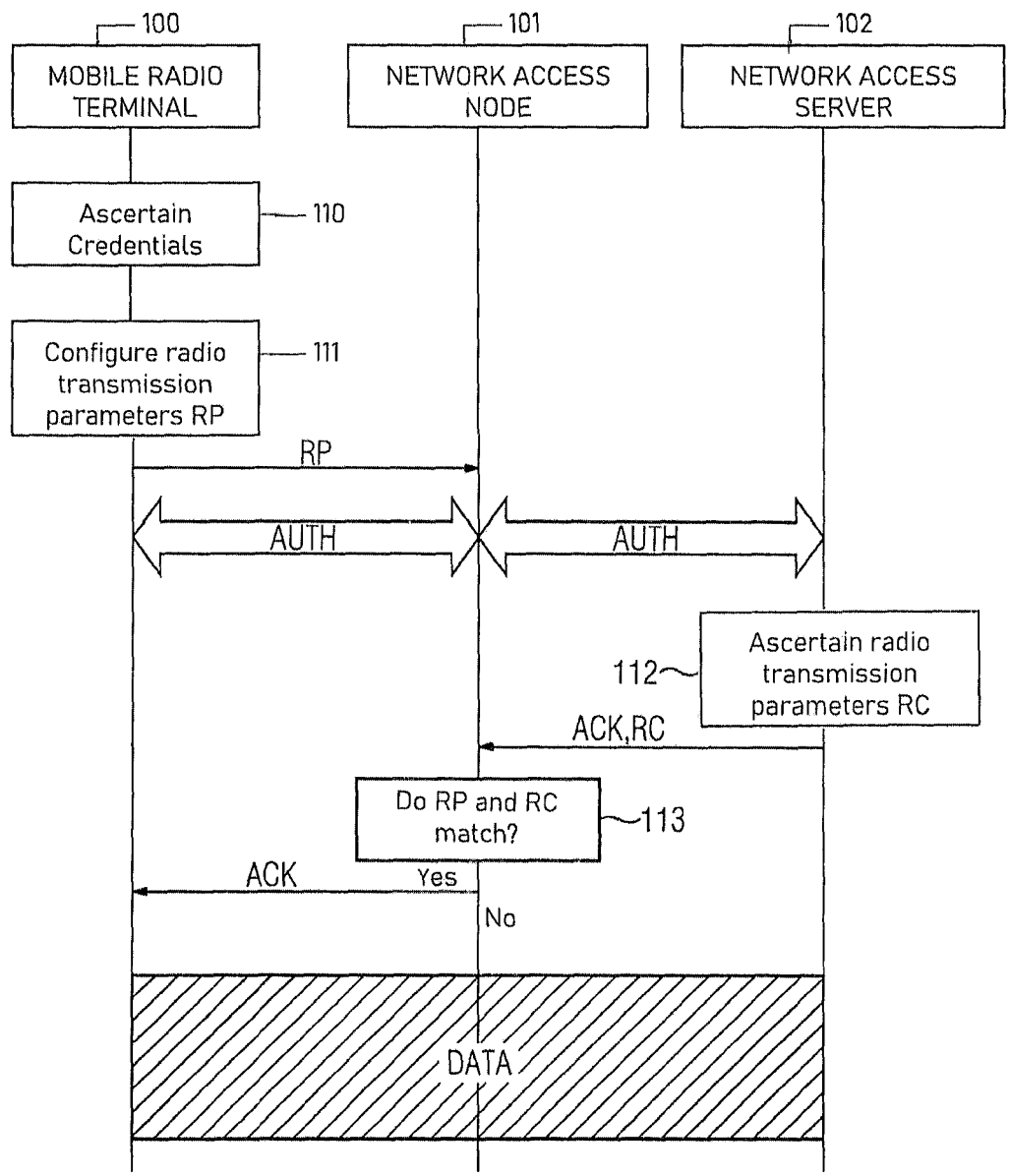
FIG. 3 shows a second exemplary embodiment of the method as a message flow diagram.

For the access request from the mobile radio terminal to a selected subnetwork with a type-2 credential, a network access authentication using an authentication protocol is performed, in particular. FIG. 3 shows a first variant in the form of a message flow diagram between a mobile radio terminal 100, a network access node 101 of a second subnetwork and a network access server 102 of a mobile radio network.

The mobile radio terminal 100, or a user of the mobile radio terminal 100, generates an access request for the second subnetwork. The mobile radio terminal 100 then ascertains an associated type-2 credential, for example a digital certificate, from, see 110. The mobile radio terminal 100 configures its radio transmission module on the basis of the radio transmission parameters RP contained in the selected type-2 credential, see 111. Moreover, the mobile radio terminal 100 provides applicable information about the radio transmission parameters RP of the mobile radio terminal 100 to the network access node 101.

The mobile radio terminal 100 performs a network access authentication AUTH, for example using the EAP-TLS authentication and key agreement protocol, and to that end transmits the ascertained type-2 credential, in particular a digital certificate, to the network access server 102 via the network access node 101.

In the network access server 102, an authentication of the mobile radio terminal, or of its user, is performed on the basis of the type-2 credential, for example in accordance with an EAP-TLS protocol. The network access server 102 additionally ascertains the radio transmission parameters RC of the type-2 credential, or digital certificate, used, see 112. A successful authentication ACK results in the network access server 102 transmitting an authentication acknowledgement ACK and the radio transmission parameters RC to the network access node 101.

The network access node 101 checks whether the radio transmission parameters RP transmitted by the mobile radio terminal 100 match the radio transmission parameters RC received from the network access server 102, see 113. If the result of the check is positive, the network access node 101 transmits an authentication acknowledgement ACK to the mobile radio terminal 100. If the result of the check is negative, i.e. the radio transmission parameters RP do not match the radio transmission parameters RC, the access request is denied and the radio connection DATA is not set up.

In a second variant, the radio transmission parameters RC are provided to the access network, in particular the network access node 101, by the network access server 102 during the EAP-based authentication.

In a third variant, the access network itself, in particular the network access node 101, extracts the radio transmission parameters RC from the type-2 credential by evaluating an authentication message transmitted between the mobile radio terminal 100 and the network access server 102 during the network access authentication AUTH, for example by a so-called deep packet inspection. This variant has the advantage that the radio access network can inspect the radio transmission parameters independently of a network access server.

Figure 4:
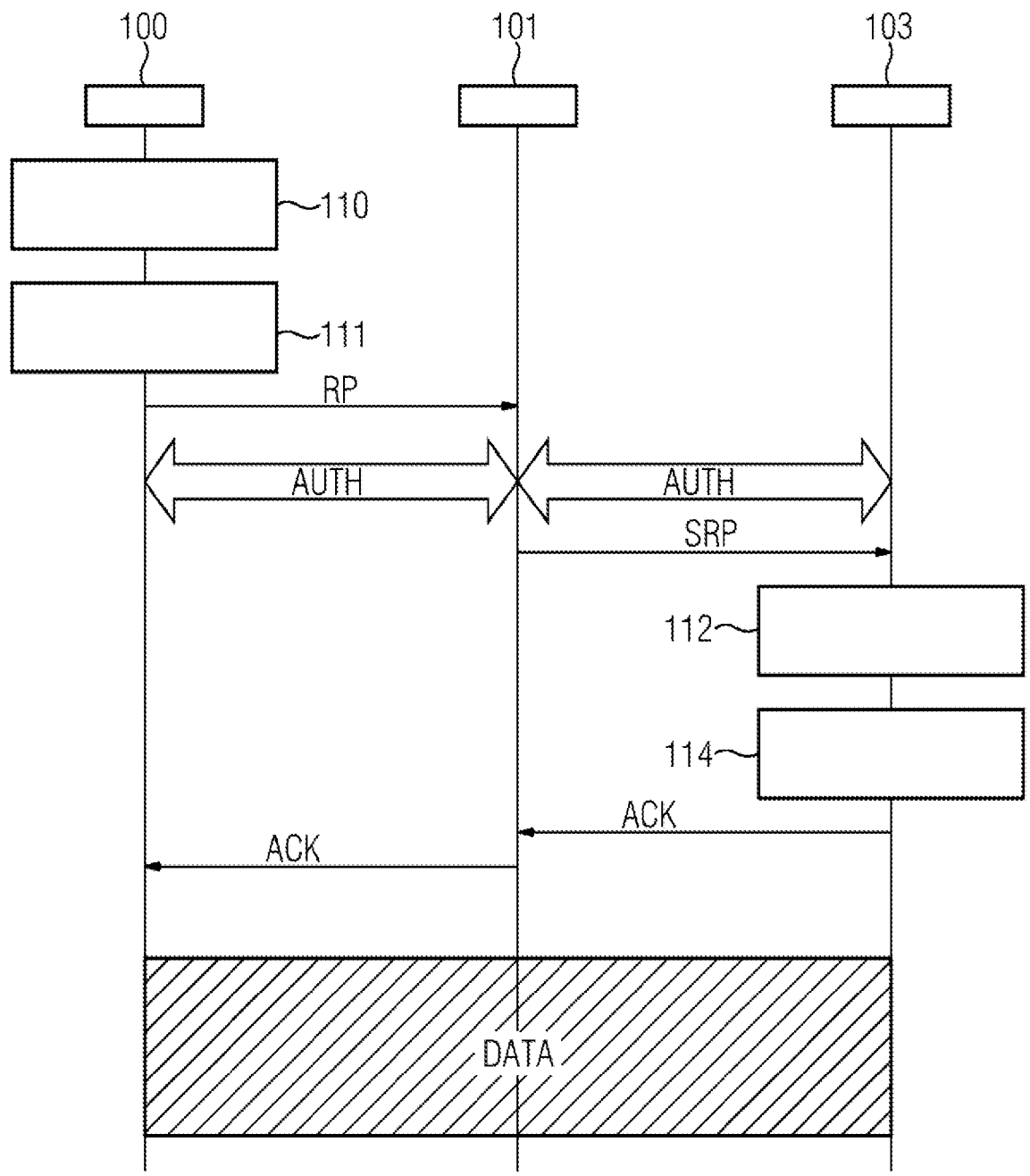
FIG. 4 shows a third exemplary embodiment of the method as a message flow diagram.

FIG. 4 shows a variant in which the radio access node 101 ascertains the radio transmission parameters SRC used by the mobile radio terminal 100 for a second radio connection and provides the radio transmission parameters to the network access server 102. At 112, the network access server 102 ascertains the radio transmission parameters from the type-2 credential and, at 114, checks whether the radio transmission configuration SRP used by the mobile radio terminal 100 is permissible in accordance with the radio transmission parameters RC included in the type-2 credential used. If the result of the check is positive, a successful authentication ACK is transmitted to the mobile radio terminal.

Figure 5:
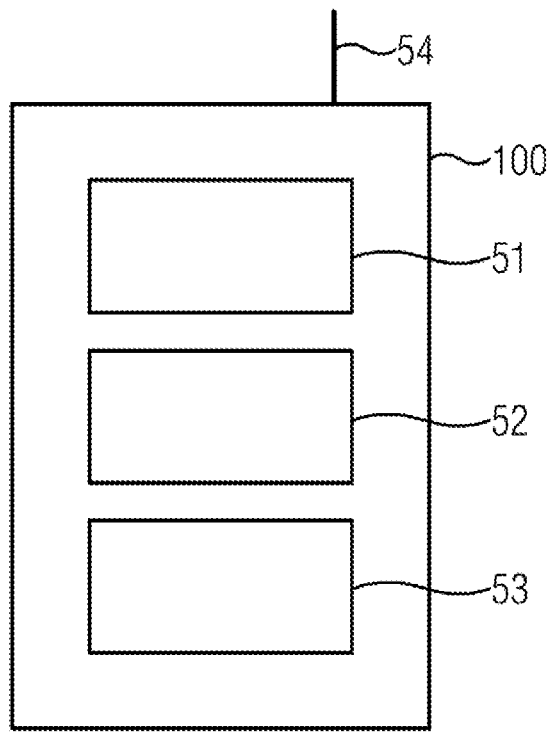
FIG. 5 shows a block diagram of an exemplary embodiment of a mobile radio terminal.

FIG. 5 shows a mobile radio terminal 100 comprising a storage unit 51 that stores the type-1 permission information and type-2 credential, for example. The mobile radio terminal 100 moreover comprises a radio control unit 52 that ascertains the predetermined credential and the radio transmission parameters linked thereto for an access request for the selected subnetwork. The mobile radio terminal 100 moreover comprises a radio connection unit 53 that configures a first or second radio connection in accordance with the ascertained radio transmission parameters and provides the radio connection via an antenna 54.

Figure 6:
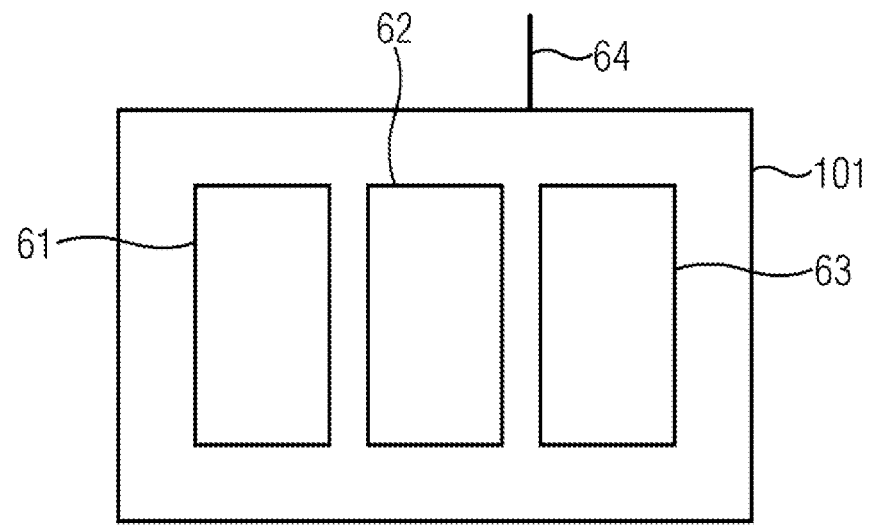
FIG. 6 shows a block diagram of an exemplary embodiment of a network access node.

FIG. 6 shows a network access node 101, containing an evaluation unit 61 in which the radio transmission parameters configured by the mobile radio terminal 100 are ascertained and/or evaluated in accordance with the variants described above, or the radio transmission parameters provided by the network access server 102, and ascertained from the credential, are checked against the radio transmission parameters configured by the mobile radio terminal 100. On the basis of the result of the check or a report from a network access server 102, the radio transmission parameters are configured and activated in a radio connection unit 63, and a connection is output via the antenna 64 in accordance with the radio transmission parameters. The network access node 101 moreover comprises a radio control unit 62 that ascertains and activates the predetermined credential and the radio transmission parameters linked thereto for an access request for the selected subnetwork.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for configuring a radio connection between a mobile radio terminal and a mobile radio network, wherein the mobile radio network contains at least one first subnetwork, which is accessible with a credential of at least one first type, and at least one second subnetwork, which is accessible with a credential of at least one second type, wherein a first radio connection to the first subnetwork and a second radio connection to the second subnetwork have different radio transmission parameters, wherein an access request from the mobile radio terminal to the first or second subnetwork results in the credential predetermined for the access request for the first or second subnetwork being ascertained, the method comprising:
   ascertaining a type of the predetermined credential;
   selecting and activating at least one radio transmission parameters on a basis of the type of the predetermined credential, wherein the first credential is configured only for use in a first authentication protocol and the second credential is configured only for use in a second authentication protocol, the first authentication protocol and the second authentication protocol being different authentication protocols; and
   ascertaining, by the network access node, that the at least one selected radio transmission parameter matches one or more radio transmission parameters received by the network access node from a network access server that previously received the one or more radio transmission parameters from the mobile radio terminal and in response, transmitting, by the network access node to the mobile radio terminal, an authentication acknowledgement ACK that the access request is granted.

2. The method as claimed in claim 1, wherein the first radio connection and the second radio connection are provided using an identical radio transmission method.

3. The method as claimed in claim 1, wherein the mobile radio network is a cellular mobile radio network, the cellular mobile network being a 5G network based on a standard of a third-generation partnership project 3GPP, and the first subnetwork is a public mobile radio network and the second subnetwork is a non-public mobile radio network.

4. The method as claimed in claim 1, wherein the access request is made when a mobile radio terminal or a network access node or a machine connected to the mobile radio terminal is started and/or is in operation and/or when the mobile radio terminal is authenticated in the subnetwork.

5. The method as claimed in claim 1, wherein the credential of the second type is a digital certificate and is used to authenticate the mobile radio terminal for access to the mobile radio network.

6. The method as claimed in claim 1, wherein the credential of the second type contains restrictive information about prohibited radio transmission parameters, and applicable radio transmission parameters are not activated.

7. The method as claimed in claim 1, wherein the credential of the second type contains positive information about permitted radio transmission parameters, and only permitted radio transmission parameters are activated.

8. The method as claimed in claim 5, wherein the credential of the second type contains additional information about a geographical scope of application and/or a temporal scope of application of the radio transmission parameters.

9. The method as claimed in claim 1, wherein predetermined information comprising a predetermined set of radio transmission parameters is associated with a type-2 credential and the predetermined set of radio transmission parameters is activated if the type-2 credential contains no information about the radio transmission parameters.

10. The method as claimed in claim 1, wherein the network access server ascertains the radio transmission parameters from a type-2 credential during a network access authentication of the mobile radio terminal, and wherein network access is granted only if the radio transmission parameters of the radio connection from the mobile radio terminal to a network access node tally with the ascertained radio transmission parameters of the type-2 credential.

11. The method as claimed in claim 10, wherein the network access node ascertains the radio transmission parameters of the radio connection to the mobile radio terminal and provides the ascertained radio transmission parameters to the network access server or to the network access node for comparison with the radio transmission parameters from the type-2 credential.

12. A mobile radio terminal for configuring a radio connection to a mobile radio network, comprising:
   at least one processor; and
   a storage unit coupled to the at least one processor;
   wherein the at least one processor, in an event of an access request from the mobile radio terminal to a selected subnetwork, is configured to:
      ascertain a credential predetermined for the access request for the selected subnetwork;
      ascertain a type of the predetermined credential;
      select and activate at least one radio transmission parameter on a basis of the type of the credential used, wherein the first credential is configured only for use in a first authentication protocol and the second credential is configured only for use in a second authentication protocol, the first authentication protocol and the second authentication protocol being different authentication protocols;
      receive, from the network access node, an authentication acknowledgement ACK that the access request is granted, in response to the network access node having ascertained that the at least one selected radio transmission parameter matches one or more radio transmission parameters received by the network access node from a network access server that previously received the one or more radio transmission parameters from the mobile radio terminal.

13. A network access node, which terminates a radio connection from a mobile radio terminal at the network end, for configuring a radio connection between a mobile radio terminal and a mobile radio network, comprising at least one processor that is configured so as, on receiving an access request from the mobile radio terminal to a selected subnetwork to:

ascertain a credential predetermined for the access request for the selected subnetwork;

ascertain a type of the predetermined credential;

select and activate at least one radio transmission parameter on a basis of the type of the credential used, wherein the first credential is configured only for use in a first authentication protocol and the second credential is configured only for use in a second authentication protocol, the first authentication protocol and the second authentication protocol being different authentication protocols; and check whether the at least one radio transmission parameter transmitted by the mobile radio terminal matches radio transmission parameters received from a network access server;

ascertain that the at least one selected radio transmission parameter matches one or more radio transmission parameters received by the network access node from a network access server that previously received the one or more radio transmission parameters from the mobile radio terminal and in response, transmit, to the mobile radio terminal, an authentication acknowledgement ACK that the access request is granted.

14. A computer program product, comprising a computer readable hardware storage device having computer readable program code stored therein, said program code executable by a processor of a computer system to implement a method as claimed in claim 1.

* * * * *